United States Patent [19]

Yoshida et al.

[11] Patent Number: 4,843,589

[45] Date of Patent: Jun. 27, 1989

[54] WORD STORAGE DEVICE FOR USE IN LANGUAGE INTERPRETER

[75] Inventors: Hideo Yoshida, Kashihara; Shigenobu Yanagiuchi, Tenri, both of Japan

[73] Assignee: Sharp Kabushiki Kaisha, Osaka, Japan

[21] Appl. No.: 419,535

[22] Filed: Sep. 17, 1982

Related U.S. Application Data

[63] Continuation of Ser. No. 135,449, Mar. 31, 1980, abandoned.

[30] Foreign Application Priority Data

Mar. 30, 1979 [JP] Japan .................................. 54-39212

[51] Int. Cl.⁴ ............................................. H03M 7/30
[52] U.S. Cl. ................................................... 364/900
[58] Field of Search .............................. 364/200, 900; 340/347 DD

[56] References Cited

U.S. PATENT DOCUMENTS 4,124,843  11/1978  Bramson ............................ 364/900

Primary Examiner—David Y. Eng
Attorney, Agent, or Firm—Birch, Stewart, Kolasch & Birch

[57] ABSTRACT

A portable electronic language interpreter device comprises an input device for entering a specific word, an abbreviation memory device, and an access device responsive to inputs entered via the input device for addressing the abbreviation memory device to cause retrieval in connection with the specific word. The abbreviation memory device memorizes a great number of words by the usage of abbreviated code information by which a certain number of letters of the words are compressed to allow the minimization of storage capacity. Preferably, the words stored in the memory are related to spelling, meaning, a part of speech, phonetic symbols, varied forms, spelling for a phrase, the meaning for the phrase and the like.

10 Claims, 13 Drawing Sheets

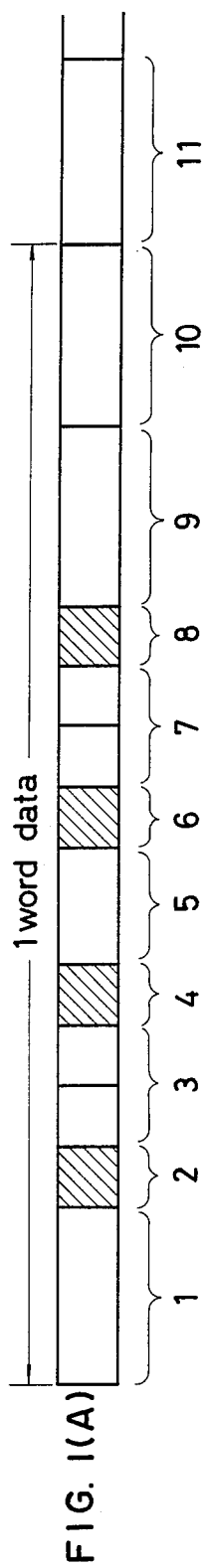
FIG. I(A)
FIG. I(B)
FIG. I(C)
FIG. I(D)
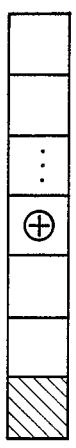
FIG. I(E)
FIG. I(F)
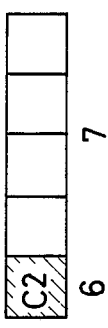
FIG. I(G)

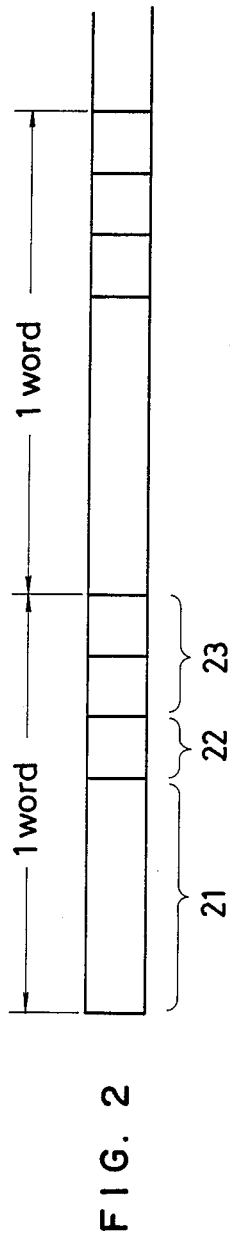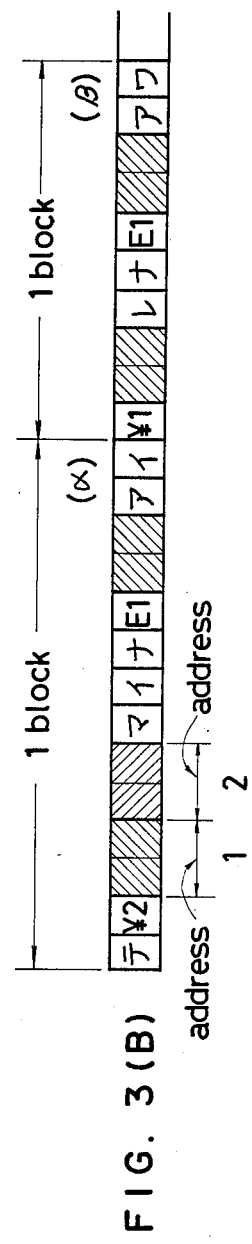
FIG. 2
FIG. 3(A)
FIG. 3(B)

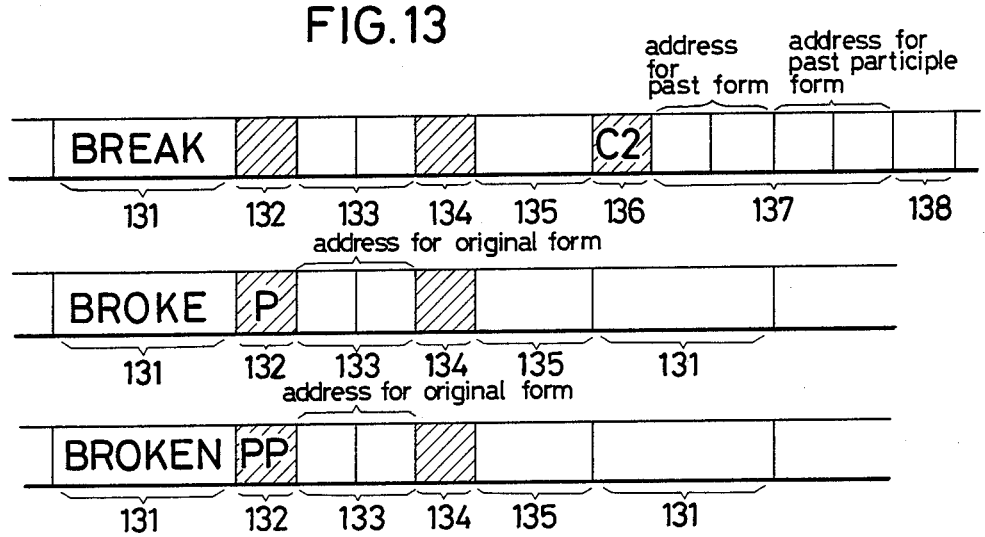
FIG.13
FIG.14
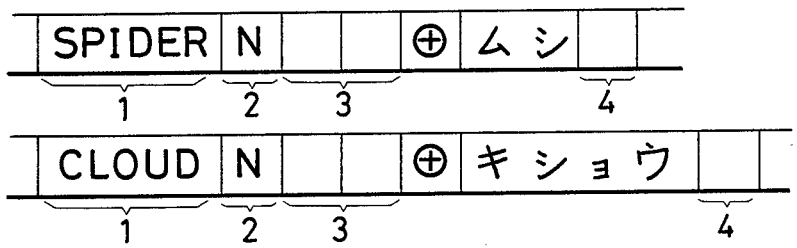
FIG.15
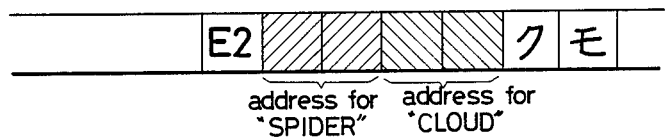
FIG.16
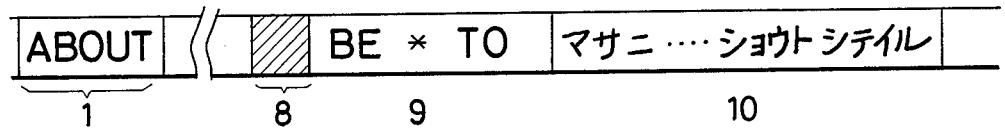

WORD STORAGE DEVICE FOR USE IN LANGUAGE INTERPRETER

This application is a continuation of copending application Ser. No. 135,449 now abandoned, filed on Mar. 31, 1980.

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and language interpreter has been available on the market. The electronic dictionary and language interpreter differ from any conventional types of electronic devices in that the former is of a unique structure which provides for efficient and rapid retrieval of word information stored in a memory. An example of such an electronic dictionary and language interpreter is disclosed in Levy U.S. Pat. No. 4,158,236, June 12, 1979, "ELECTRONIC DICTIONARY AND LANGUAGE INTERPRETER".

For those portable devices, it is further desirable that word information to be stored in a memory be compressed in order to memorize as large a quantity of word information as possible when loading into the memory.

SUMMARY OF THE INVENTION

Accordingly, it is the primary object of the present invention to provide an improved portable language interpreter.

It is a further object of the present invention to provide an improved portable language interpreter comprising an improved word information storage device wherein word information is stored in a compressed form so as to increase capacity for other kinds of word information.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a portable electronic language interpreter device comprises an input device for entering a specific word, an abbreviation memory device, and an access device responsive to inputs entered via the input device for addressing the abbreviation memory device to cause retrieval in connection with the specific word. The abbreviation memory device memorizes a great number of words by the usage of abbreviated code information by which a certain number of letters of the words are compressed to use a minimum amount of storage capacity. Preferably, the words stored in the memory are related to spelling, meaning, a part of speech, phonetic symbols, varied forms, spelling for a phrase, the meaning for the phrase and the like.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 1(A) through 1(G) are schematic representations of a word information storage format for use in a memory in accordance with the principle of the present invention;

FIG. 2 is a schematic representation of a storage format of a translated word adapted in the memory;

FIGS. 3(A) and 3(B) are schematic representations of a compression form applied to a translated word in accordance with the principle of the present invention;

FIGS. 13 through 16 are schematic representations of word information storage formats for use in the memory according to the present invention.

DESCRIPTION OF THE INVENTION

First of all, any language can be applied to an electronic language interpreter of the present invention. An input "source" word or words are spelled in a specific language to obtain an equivalent word or words, or a translated word spelled in a different language corresponding thereto. The languages can be freely selected. According to an example of the present invention, it is assumed that the specific language is English and the different language is Japanese and vice versa.

Figure 1:
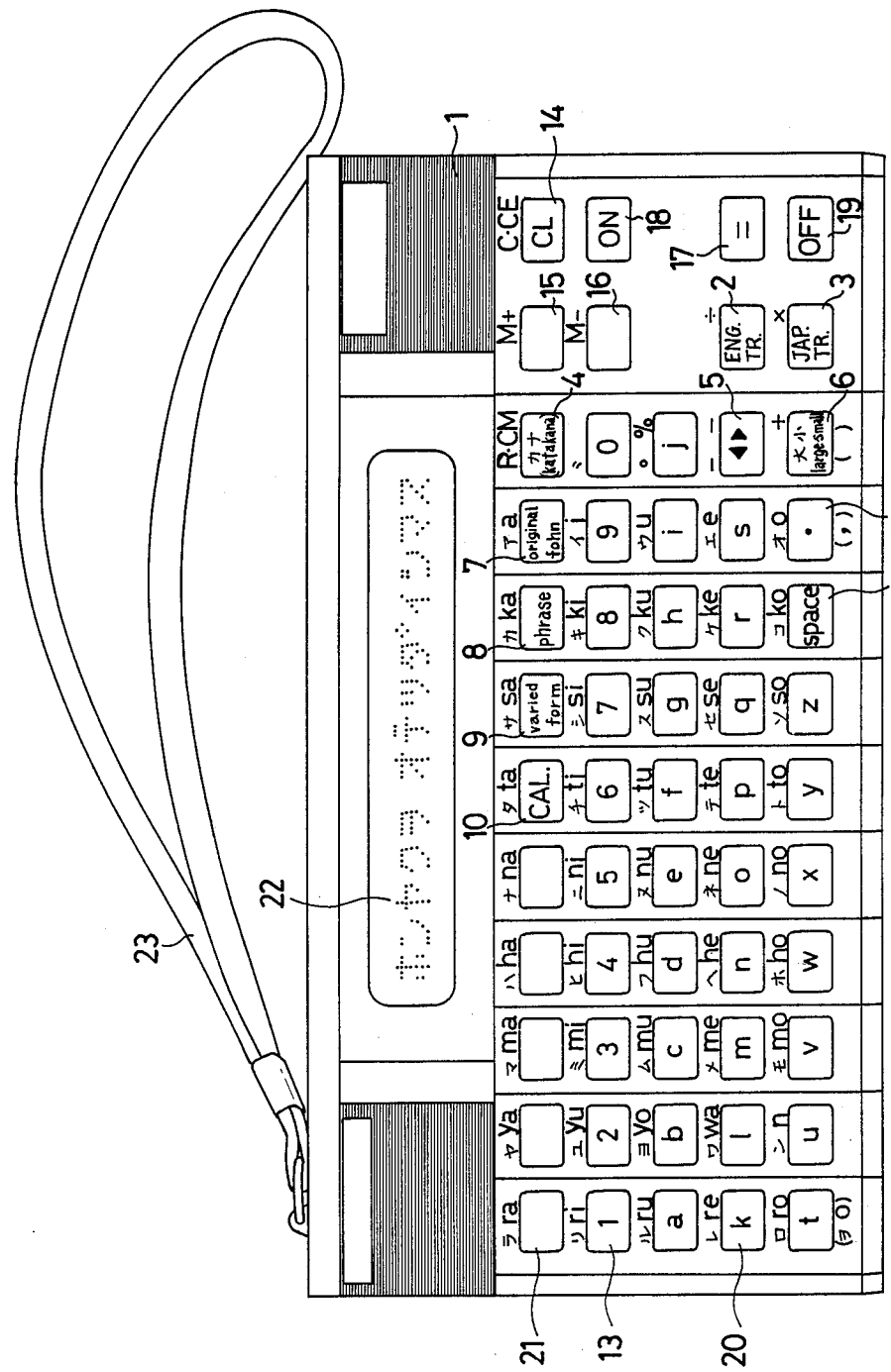
FIG. 1 is a plan view of a portable electronic language interpreter according to the present invention.

Referring to FIG. 1, there is shown a portable electronic language interpreter according to the present invention. The portable electronic language interpreter comprises a main frame 1, a plurality of kinds of key switches 2 through 21, a display 22, and a strap 23.

The plurality of key switches 2 through 21 include a plurality of alphabetical key switches 20 and 21, ten numeral key switches 13, certain kinds of function key switches 4, 14, 15, 16 and 17, a power-on key 18, and a power-off key 19. The plurality of alphabetical key switches 20 are selectively actuated to enter particular English words. A major number of the alphabetical key switches 20 are also actuated to enter particular Japanese words by selection. Such a major number of the alphabetical key switches 20 are referred to as Japanese syllabary key switches 21 aligned in Japanese alphabetical order. Each of all the key switches is labeled by respective symbols specifying the function. All of the Japanese syllabary key switches 21 are labeled in the Japanese alphabet. Besides the Japanese alphabets, the Roman letters are provided to assist the understanding by foreigners unfamiliar with the Japanese alphabets.

More particularly, an English translation key 2 is operated to conduct retrieval from a particular Japanese word to an equivalent English word. A Japanese translation key 3 is operated to perform retrieval from a particular English word to an equivalent Japanese word. A "katakana" key 4 is activated wherein all the following letters entered by the key switches are represented in Japanese "katakana" letters rather than any other forms. Without the actuation of the "katakana" key 4, the letters entered by the key switches are represented in English.

A homonym key 5 is operated to cause retrieval for one or more homonyms. A large/small letter selection key 6 is operated in which the just following letter entered by the key switch is represented in a small letter in a Japanese "katakana" letter designating an assimilated sound. An original form key 7 is operated to direct that the following letters are a particular original form. A phrase key 8 is operated to perform retrieval of one phrase using a particular English word which is entered by the actuation of the key switches or otherwise is obtained by the retrieval. Upon the actuation of the phrase key 8 in succession, two or more phrases using the same particular English word are developed.

A varied form key 9 is actuated to obtain by the retrieval one or more varied forms on the basis of a particular English word. A calculation key 10 is operated to select a calculation mode functioning as an electronic calculator in the portable electronic language interpreter. A space key 11 is energized to allocate a space between two distinct words. When the large/small letter selection key 6 is actuated and a key switch labeled by "t" is operated, a Japanese "katakana" letter corresponding to an English letter "o" is entered. When the space key 11 is actuated after the actuation of the space key 11, apostrophe mark is entered in connection with the preceding word.

The power-on key 18 and the power-off key 19 are actuated to allow the portable electronic language interpreter to be turned on and off.

The ten numeral key switches 13 and the function key switches 4 and 14 to 17 are operated in combination to perform an electronic calculator function in the calculation mode selected in the portable electronic language interpreter. Since the electronic calculator function is not concerned with the crux of the present invention, further description is omitted.

The display 22 indicates a particular English or Japanese word which is entered by the alphabetical key switches 20, an equivalent Japanese or English word obtained by the retrieval to a memory contained in the portable electronic language interpreter. Any other words needed to be obtained by the retrieval are as well indicated in the display 22. Preferably, the display 22 is made of a liquid crystal display containing a liquid crystal mixture. The string 23 is connected to the main frame 1 to be portable.

Prior to the description of operation of the portable device of the present invention, detailed description will be referred to regarding the compression, the normalization, and the classification of word information which is stored in a memory.

THE NORMALIZATION OF WORD INFORMATION AND STORAGE MANNER

Word information as used in the portable language interpreter of the present invention contains information about spelling, a part of speech, a meaning, a phonetic symbol, one or more kinds of varied forms, spelling of a phrase and a meaning of a phrase. The respective word information is converted to coded information as described below and the coded information is stored in a memory such as a read only memory (ROM) etc. in a normalized form as shown in FIG. 1(A).

According to the compression of storage capacity of word information for use with the present invention, a large number of kinds of characters are constructed in the memory each of which represents a unique letter or symbol. When it is assumed that a unit of information stored in one address of the memory is 8 bits, the conventional memory has a capacity of 256 sorts of characters. The present invention is not limited to 8-bit format, although described in this format.

Table 1 indicates the relations between each pair comprising a character and a code. In Table 1, $A'_0$ through $A'_7$ are referred to the respective bits all of which constitute 8 bits as a whole. A unique character is specified as a combination of a first code related to $A'_3$ to $A'_0$ and a second code related to $A'_7$ to $A'_4$. A great number of combinations by the first and the second codes are stored in the memory. Upon retrieval, the first and the second codes are decoded to obtain the word information required.

TABLE 1

| $A'_3 \sim A'_0$ | \multicolumn{16}{c}{$A'_7 \sim A'_4$} |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| 0 | a | q | A | Q | a. | | $E_1$ | 0 | i: | ɔə | ア | チ | ム | | | |
| 1 | b | r | B | R | ad. | ¥1 | $E_2$ | 1 | ɛ | ʊə | イ | ツ | メ | | | |
| 2 | c | s | C | S | vi. | ¥2 | $S_2$ | 2 | aɪ | ʊ | ウ | テ | モ | | | |
| 3 | d | t | D | T | vt. | $C_1$ | $S_3$ | 3 | ɔ | θ | エ | ト | ヤ | | | |
| 4 | e | u | E | U | v. | $C_2$ | $S_4$ | 4 | ɔɪ | ð | オ | ナ | ユ | | | |
| 5 | f | v | F | V | pref. | * | $S_5$ | 5 | ʊɪ | ʃ | カ | ニ | ヨ | | | |
| 6 | g | w | G | W | prev. | P. | $S_6$ | 6 | ʌ | ʒ | キ | ヌ | ラ | | | |
| 7 | h | x | H | X | pron. | PP. | $S_7$ | 7 | ə | tʃ | ク | ネ | リ | | | |
| 8 | i | y | I | Y | aux. | WP. | $S_8$ | 8 | əɪ | $d_3$ | ケ | ノ | ル | | | |
| 9 | j | z | J | Z | conj. | | $S_9$ | 9 | ei | | コ | ハ | レ | | | |
| A | k | | K | | n. | | | | ou | | サ | ヒ | ロ | | | |
| B | l | | L | | art. | | | | ai | | シ | フ | ワ | | | |
| C | m | . | M | | | | | | au | | ス | ヘ | ヲ | | | |
| D | n | | N | | | | | | ɔi | | セ | ホ | ン | | | |
| E | o | | O | | | | | | iə | | ソ | マ | | | | |
| F | p | | P | | | | | | Eə. | | タ | ミ | | | | |

In Table 1, the respective characters specified by the code referred to $A'_7$ to $A'_4$ are as follows:

| $A'_7 - A'_4$ | Contents of the characters |
|---|---|
| 0 and 1 | English alphabetical small letters |
| 2 and 3 | English alphabetical capital letters |
| 4 | A part of speech |
| 5 | ¥ 1: a symbol representing that only one kind of address follows |
| | ¥ 2: a symbol representing that two kinds of addresses follow |
| | C 1: a code representing that |

-continued

| A'7 – A'4 | | Contents of the characters |
|---|---|---|
| | | a past form of a particular English word is identical to the past participle form |
| | C 2: | a code representing that a past form of a particular English word is not identical to the past participle form |
| | *: | a code used in forming a phrase for representing a particular English word |
| | P.: | a code representing that a form of a particular English word is employed as a past tense form |
| | PP.: | a code representing that a form of a particular English word is used as a past participle form |
| | WP.: | a code representing that a form of a particular English word is used as both a past tense form and a past participle form |
| 6 | E 1: | an end code for representing that the number of a particular word is only one |
| | E 2: | an end code for representing that the number of a particular word is two |
| | | $2 through $9: a code indicating a leading address and representing that the second digit numerical value following the first symbol "$" specifies the number of two or more letters of the same serial number as the second digit numerical value, in which the two or more letters are in common with another particular English word preceding a particular English word |
| 7 | | digit numerical values of ten |
| 8 and 9 | | phonetic symbols |
| A to C | | Japanese syllabary |

As shown in Table 1, some specified codes are provided to facilitate the decoding operation.

Referring now to FIG. 1(A), there are shown a plurality of addresses of a memory comprising 1 to 11 blocks, in which 1 to 10 blocks constitute the word data.

Block 1: there is contained information of a spelling of a particular word by the compressed manner as described below.

Block 2: there is contained information of a word portion in one byte (8 bits). For example, "pron." is stored in the form of a code of "01000111" in the memory. Since information of only a part of speech such as a word portion is stored in the memory in a code instead of being directly stored in the memory, this reduces the capacity required therefor.

Block 3: there is stored information of one or more addresses in two bytes directing where a Japanese translated word (a meaning) is stored.

By selecting the one or more addresses of two bytes following the information for a part of speech, a particular Japanese translated word of "katakana" is obtained by decoding a train of codes developed from the memory.

Block 4: there is stored information representing that information stored in block 5 indicates one or more phonetic symbols.

Block 5: there is stored information designating one or more phonetic symbols. A paired phonetic symbol such as "au", "tʃ" etc. is represented by only one code in the memory.

Block 6: there is stored information representing that information stored in block 7 indicates one or more addresses in which one or more varied forms on the basis of a form of a particular English word are stored. The information stored in block 6 is C1 as shown in FIG. 1(F) or C2 as shown in FIG. 1(G).

Since C1 is a code representing that a past form of a particular English word is identical to the past participle form, an address code comprising only two bytes is required to indicate an address in which a spelling is stored. On the other hand, as C2 is a code representing that a past tense form is not identical to the past participle form, at least four bytes are required to indicate two addresses each of which stores the past tense form and the past participle form. The first two bytes just following C2 code indicate an address in which a past tense form is stored while the second two bytes indicate an address in which a past participle form is stored.

Block 7: there is stored information of address.

Block 8: there is stored information representing that information stored in block 9 should form a phrase.

Block 9: there is stored information representing one or more alphabetic letters forming a phrase.

Block 10: there is stored information indicating a Japanese translated word equivalent to the phrase specified by the one or more alphabetical letters stored in block 9. Preferably, the information of block 10 designates one or more Japanese "katakana" letters. The distinction between blocks 9 and 10 is made according to the nature of the respective information rather than according to any specific separation code information.

More particularly, in block 9, the information comprises "*" code and one or more alphabetical codes. The spelling developed in block 1 replaces "*" code. When block 1 stores a spelling of a past tense form or a past participle form of one irregular verb, blocks 2 and 3 are represented in one form selected from those shown in FIGS. 1(B), 1(C), and 1(D). In such a case, the information of a part of speech is replaced by one among P., PP. and WP., P. indicates that the spelling stored in block 1 is used as the preterite. PP. indicates that the spelling stored in block 1 is used as the past participle. WP. indicates that the spelling stored in block 1 is used as the preterite and the past participle.

The information of block 3 represents one or more addresses in which the infinitive of the irregular verb is stored. The infinitive is stored in block 1. When one among P., PP. and WP. is detected in the retrieval operation, an indication of the distinction of the past form and the past particle form is enabled together with the indication of the infinitive. By utilizing the information stored in block 1 representing the infinitive, the storage for the preterite and the past participle are compressed in capacity.

In the case where additional information is required to assist the understanding of the meaning stored in the address specified by the information stored in block 3, "+" code is provided following the address code information of block 3, in which after the "+" code there is stored the additional information supplementing the meaning.

FIG. 2 shows the storage format of a meaning or a Japanese translated word in blocks 21 to 23.

Block 21: there is stored information of a meaning or a Japanese translated word preferably in the Japanese "katakana" letters.

Block 22: there is stored information for separating two kinds of information stored in blocks 21 and 23 and for representing the length (the number) of the information of block 23.

Block 23: there is stored information comprising two bytes representing one address in which a particular English word equivalent to the meaning or the Japanese translated word stored in block 21.

A number of spellings of particular English words and the equivalent Japanese translated words are stored in different areas of the memory. A number of spellings are aligned in alphabetical order and the equivalent Japanese translated words are aligned in Japanese alphabetical order. The respective information is linked by information representing an address provided in conjunction with another type of information to each other. This results in shortening retrieval time required to complete the retrieval from English to Japanese and vice versa.

THE COMPRESSION OF SPELLING OF ENGLISH WORDS AND THE EQUIVALENT JAPANESE TRANSLATED WORDS TO BE STORED (1) The compression of spellings of English words to be stored in the memory is performed as shown in Table 2 in which some words starting at "sa" are exemplied.

TABLE 2

| Sacrifice | salt |
|---|---|
| $\overline{\$3}$ | |
| sad | same |
| $\overline{\$2}$ | $\overline{\$2}$ |
| sadly | sand |
| $\overline{\$3}$ | $\overline{\$2}$ |
| sadness | sandwich |
| $\overline{\$3}$ | $\overline{\$4}$ |
| safe | santaclaus |
| $\overline{\$2}$ | $\overline{\$3}$ |
| safely | satisfaction |
| $\overline{\$4}$ | $\overline{\$2}$ |
| safety | satisfactory |
| $\overline{\$4}$ | $\overline{\$9}$ |
| said | satisfy |
| $\overline{\$2}$ | $\overline{\$6}$ |
| sail | saturday |
| $\overline{\$3}$ | $\overline{\$3}$ |
| sailor | sauce |
| $\overline{\$4}$ | $\overline{\$2}$ |
| sake | savage |
| $\overline{\$2}$ | $\overline{\$2}$ |
| sale | save |
| $\overline{\$2}$ | $\overline{\$3}$ |
| salesman | say |
| $\overline{\$4}$ | $\overline{\$2}$ |
| sally | |
| $\overline{\$3}$ | |

More particularly, in Table 2, it is assumed that "Sacrifice" is the first word of various words starting at "sa". The word "Sacrifice" is converted into codes as summarized in Table 1 and the resultant codes are stored in the memory. The word "Sacrifice" requires 9 bytes. For the various words following the word "Sacrifice", "sn" code is used indicating that the symbol "s" represents the presence of two or more letters which are common to the just preceding word from the top and the second digit numerical value "n" following the first symbol specifies the number of the two or more letters of the same serial number as the second digit numerical value "n". When the "sn" code is not available, such particular words are directly converted to the alphabetical codes as summarized in Table 1.

While the second word "sad" of Table 2 requires 3 bytes in the case where the word "sad" is directly converted to the alphabetical codes, the second word "sad" is stored in the form of "s2d" according to the present invention, with the result that the word requires only 2 bytes. The third word "sadly" requires only 3 bytes by virtue of the form of "s3ly".

With the help of the compression of storage format according to the present invention, only the first word having the same leading letters as in the words following the first word is required to be stored in the complete form having all the alphabetical letters contained therein. All the following words are subject to the compression in storage capacity using the specific "sn" code.

(2) The compression of storage capacity is made by grouping a unit of a syllable and considering it one code. For example a syllable "tion" is common in two words of "instruction" and "production". The syllable "tion" is grouped which is converted into only one code, thus the compression of storage capacity being accomplished. Other syllables such as "ing" etc. are similarly grouped which are converted into only one code. When such a code is detected in the retrieval from Japanese to English, it is decoded into the syllable.

(3) The compression of storage capacity of Japanese translated words is accomplished as follows:

As shown in FIG. 2, respective Japanese translated words are normalized in Japanese alphabetical order. The respective blocks 21, 22, and 23 have the function as described above. When the meaning or the Japanese translated word stored in the block 21 is related to two or more English words, block 22 stores information representing the length of the address codes stored in block 23 and additional blocks which are added to block 23. In the case where a Japanese translated word stored in block 21 specifies at least two English words having the same sound, at least two kinds of addresses comprising 4 bytes as block 23 and the additional blocks are required each of which contains one English word. The two English words are stored normally in the distinct address. These circumstances are shown in FIGS. 14 and 15.

FIGS. 3(A) and 3(B) show storage formats containing specific meanings. FIG. 3(A) shows four kinds of Japanese words to be stored. The storage format shown in FIG. 3(B) stores all the four kinds of Japanese words. Some Japanese "katakana" letters contained from the top in at least two kinds of Japanese words, e.g., two "katakana" letters are grouped. The common "katakana" letters are stored in parts α and β. The top letter ⊠ of the first block is a letter by removing the common "katakana" letters from the word " パイテ ". The following information " ¥2" indicates the presence of two equivalent English words, "companion" and "partner" corresponding to the particular Japanese word " パイテ ".

The following first address 1 and the second address 2 specify addresses in which the two English words are stored respectively. The following letters ▨▨ are obtained by removing the common "katakana" letters from the word "ｱｲﾏｲﾅ". The code E1 indicates that the last code is information for "ｱｲ" contained in α part as the common "katakana" letters. In addition, the code E1 indicates that there is only one equivalent English word corresponding to the word "ｱｲﾏｲﾅ". Information comprising two bytes following the code E1 is an address in which there is stored one English word corresponding to "ｱｲﾏｲﾅ". The last code of the common Japanese letters "ｱｲ" stored in the α part indicates that this block is concerned with a sort of combination of common Japanese letters, e.g., "ｱｲ".

This manner allows the compression of storage capacity of a certain number of letters positioned relatively at the top side of Japanese translated words.

RETRIEVAL OPERATION (1) A desired specific English word is entered by the actuation of the alphabetical key switches 20 shown in FIG. 1. The corresponding Japanese word equivalent thereto is obtained by the retrieval as follows:

The memory contains preliminarily a great number of English words in the alphabetical order and normalized as stated above. The classification of them is at first carried out according to the kind of alphabet positioned at the top. The more detailed classification is performed, taking into account the kind of alphabet positioned at the second position. In such a case, 676 blocks are required to cover all the combinations as shown in this preferred embodiment. If desired, the third or the fourth letter can be taken into consideration for the classification, although not shown.

According to the kind of the first alphabet entered by the keyboard, more significant address digits, e.g., 8 bits are determined as address information specifying the memory containing the English words and the corresponding Japanese words. For instance, "a" is referred to code information of "00000000", "b" is related to "00000001", . . . and "z" is indicated by "00011001".

In addition, according to the kind of the second alphabet, less significant address digits, 8 bits are determined as address information as follows:

Code digits corresponding to the kind of the second alphabet develops in the same manner as in the first alphabet. The value of the code digits is multiplied by two, so that the derived less significant 6 digits are employed as such as the less significant address digits, 8 bits. In this manner, a number of address areas, 676 blocks, are fixed. Table 3 shows a number of address areas defined according to this manner.

TABLE 3

| less significant address digits of 6 bits $A_5 \sim A_0$ | a | b | c | d | ... | s | ... | x | y | z |
|---|---|---|---|---|---|---|---|---|---|---|
|  | 00000000 | 10000000 | 01000000 | 11000000 | ------ | 01001000 | ------ | 11101000 | 00011000 | 10011000 |

| | |
|---|---|
| a | 0000000 |
| b | 0000010 |
| c | 0000100 |

| | |
|---|---|
| d | 0000110 |
| e | 0001000 |
| f | 0001010 |

γ
δ

| | |
|---|---|
| x | 101110 |
| y | 110000 |
| z | 110010 |

TABLE 3-continued

Referring now to Table 3, when the first letter entered is assumed to be "s", the more significant address digits of 8 bits is "00010010". When the second letter is supposed to be "a", the less significant address digits of 6 bits is "000000". Thus an address area (γ) of the memory is specified. There is provided an additional address area (δ) specified by the same combination of the address digits.

In this instance, it is assumed that a group containing a number of words having "sa" in the first and the second letters is concerned. In such a case, as shown in Table 2, the first word of a number of words is "sacrifice" wherein the two address areas (γ) and (δ) store an address in which a third letter "c" following the first and the second letters "sa" is stored. Any other address areas are adapted to contain respective addresses in which certain third letters following the first and the second letters are stored.

Figure 4:
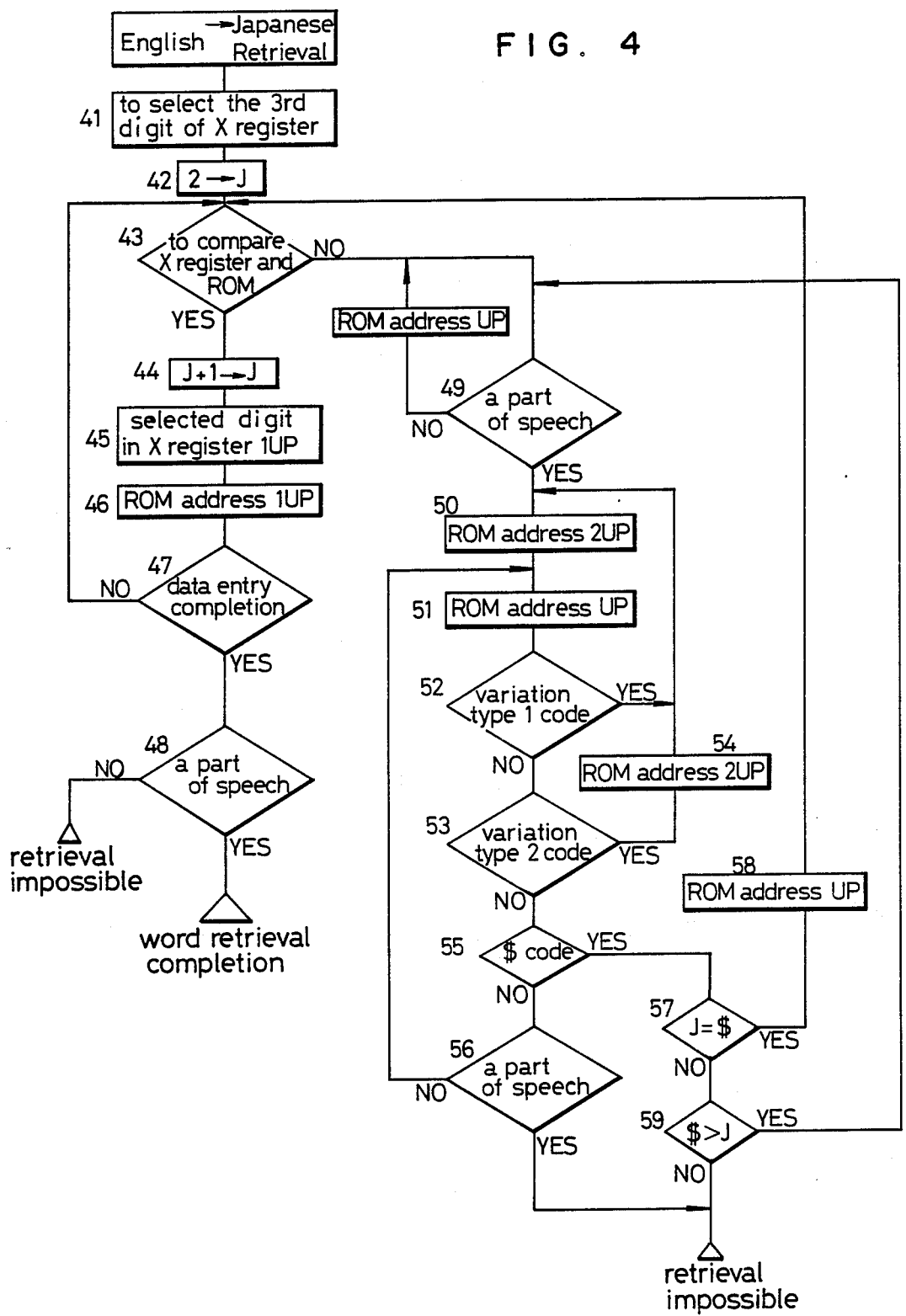
FIGS. 4 and 5 are flow charts representing retrieval processes from a Japanese word to its equivalent English word in accordance with the present invention.

FIG. 4 indicates a flow chart representing operation for the purpose of causing the retrieval of any varied form, a phrase and a Japanese translated word etc. by entering a desired English word with the help of the keyboard. A spelling of any desired English word to be examined is entered by the actuation of the keyboard. Alphabetical letters entered are converted into combinations of code information as summarized in Table 1. The combinations are in turn introduced into an X register in such a manner that the top combination representing the leading letter is applied to the first digit and so on. The X register is a storage circuit composed of a random access memory (RAM) incorporated into a large scale integrated (LSI) circuit, the storage circuit containing temporarily the combinations of code information.

Upon the actuation of the English translation key 2 or the varied form key 9, the combinations stored in the first and the second digits of the X register select specific address areas of Table 3. Particular address codes contained in the specific address areas specify an address of the memory in which a third letter following first and second letters belonging to the first words of a particular block is stored. The first and the second letters of the thus specified third letter are identical to those stored in the first and the second digits of the X register. The first and the second letters stored in the first and the second digits of the X register are classified in the particular block.

With reference to FIG. 4, the following operation is described. When the address for the third letter is selected, the program leads to the step of "English-→Japanese Retrieval" of the flow chart shown in FIG. 4. In the following step 41, the third digit of the X register is selected, since the first and the second letters stored in the X register are consistent as far as the same block having a number of words is concerned. An element "J" in step 42 is a counter functioning to count the number of letters which are determined to be identical between the contents of the X register and the memory. The number of letters is counted from the top of the words. Since the first and the second letters stored in the X register have been already consistent with those stored in the memory, a numerical value "2" is introduced into the counter J in step 42.

In step 43, a comparison is made between the combinations of alphabetical codes in a selected digit of the X register and alphabetical codes stored in the address of the memory presently selected. When the consistency is determined, the program leads to step 44 wherein, as the number of letters which are consistent is increased by one, "J+1→J" is executed. In step 45, the digit of the X register selected is advanced by one so that next letter is selected.

In step 46, the address of the memory is advanced by one so that the address area is selected containing the next letter. In step 47, the determination is conducted whether there are left data in the X register. If there are left data in it, step 43 is again executed so that the contents of the X register are compared to that of the memory. When there are left no data in it, step 48 is selected to determine whether information of a part of speech is developed from the address of the memory presently selected. If information of a part of speech is presently developed, it leads to the conclusion that the spelling of the English word is completely developed. The contents of the X register are totally consistent with those of the memory.

In step 48, if the information of a part of speech is not developed, it leads to the conclusion that the memory has one or more further letters. In other words, it is assured that the word entered is not found in the memory. When the contents of the X register are not consistent with that of the memory in step 43, the addresses of the memory are being increased subsequently, with the object that the address of the memory should be found containing the letters stored in the X register with successively determining the equivalency between the letters stored in the X register and that of the memory.

The memory has a storage format of the word information as shown in FIG. 1(A). When the spelling stored in block 1 is not consistent with the word stored in the memory, the following blocks 2 to 10 are omitted to be subject to the retrieval, with the object that the following word stored in block 11 is examined. In step 49 of FIG. 4, the determination is made whether a part of speech is selected which is stored in block 2 of FIG. 1(A). Until the part of speech information is obtained, the address of the memory is increased subsequently.

Since information comprising two bytes following the information of a part of speech is the address code, the address of the memory is advanced by two in step 50 of FIG. 4. In step 51, the address of the memory is forwarded subsequently. In step 52, the information stored in block 6 of FIG. 1(A) as a variation type 1 code (C1) is detected. As the address code of two bytes is stored in block 7 of FIG. 1(A), it is required to return back to step 50 in which the address of the memory is increased by two.

When the variation type 1 code (C1) is not detected, alternatively, a variation type 2 code (C2) is detected in step 53. As shown in FIG. 1(G), there are four bytes as the address codes following this type of variation code, so that in step 54 of FIG. 4 the address of the memory is increased by two. Coming back to step 50, the program allows the address of the memory to be increased by two, thus totally increasing the address of the memory by four.

In step 55, "sn" code is determined. This code has the meaning as described above with reference to Table 2. The first word of the particular block comprising a great number of words is represented by alphabetical codes rather than by this type of code. When the part of speech information is determined in step 56, it leads to the conclusion that there is absent any word in the memory corresponding to the word entered. When the part of speech information is not found, the program comes back to step 51 wherein the leading letter of the spelling is repeated to be found. When "sn" code is detected in step 55, step 57 is selected where the contents of the counter J are determined to be compared to "sn" code. When the equivalency is determined therebetween, it leads to the fact that a certain number of letters designated by "sn" code are consistent with the letters stored in the X register.

Therefore, step 43 is selected where the remaining parts of letters are examined. When the equivalency is not established in step 57, step 59 is selected where the comparison is conducted. When "sn" code has a larger amount than the counter J, it becomes apparent that the word entered can not be found in the memory since the number of letters in the X register which are determined to be consistent is smaller than the number of letters changed to the specific code such as "sn" code. When "sn" code is larger than the value of the counter J, step 49 is again selected where a spelling of next word is examined, as the X register does not have identical letters anymore.

In this manner, the flow chart of FIG. 4 is operated so as to cause retrieval to a certain number of address areas memorizing word information which is required to be examined.

Upon the actuation of the Japanese translation key 3, the flow chart of FIG. 4 is operated completely and then the address code of two bytes of block 3 of FIG. 1(A) following the part of speech information is introduced for the purpose of selecting the address area of the memory. In the address area, there is stored code information representing a meaning or a Japanese translated word. The thus specified code information is decoded into one or more Japanese letters, preferably, in Japanese "katakana" letters. The Japanese letters are indicated in the display 22.

In addition, after the completion of the flow chart of FIG. 4, when there is detected the presence of the variation code in block 6 of FIG. 1(A) or the phrase code in block 8 of FIG. 1(A), an indication indicating the presence of such a code is displayed in the display 22 for information purposes. Regarding a particular word having a varied form, a phrase and the like, the respective key 8 or 9 should be actuated for examination purposes.

The varied form information is selected by specifying address information which is stored following the variation code by two bytes. The address information is used to obtain a spelling of the varied form from the specified address area of the memory. The spelling of the varied form is indicated in the display 22.

A required phrase is formed by the spelling information following the phrase code while a meaning of the phrase is formed by phrase-meaning code after.

For the phonetic symbol, in response to the actuation of the Japanese translation key 3, phonetic symbol information is detected where one or more phonetic symbols are formed by the following phonetic symbol representing information. The phonetic symbols are indicated by the display 22.

(2) An equivalent English word is obtained in the form of a spelling by entering a Japanese word by the actuation of the Japanese syllabary keys 21 as follows:

The memory stores a great number of Japanese words in Japanese alphabetical order as shown in FIGS. 3(B). Japanese "katakana" letters entered are respectively converted into code information shown in Table 1 and applied to the X register. The first digit of the X register stores the top letter of the word entered. The first digit specify the leading address identifying the block grouping a great number of words having the same first and second letters. A number of blocks are classified according to the top alphabet of the words.

A comparison is made between the Japanese word code stored in the X register and code information stored in the address area selected in a every unit of a byte. When the equivalency is detected, it means that the address area corresponding to the word entered is found. When not, the address of the memory is subsequently increased to find the equivalent word. Under the circumstances where the equivalency is accomplished, the address codes following " ₨ " code and "E" code shown in FIG. 3(B) are introduced.

Figure 5:
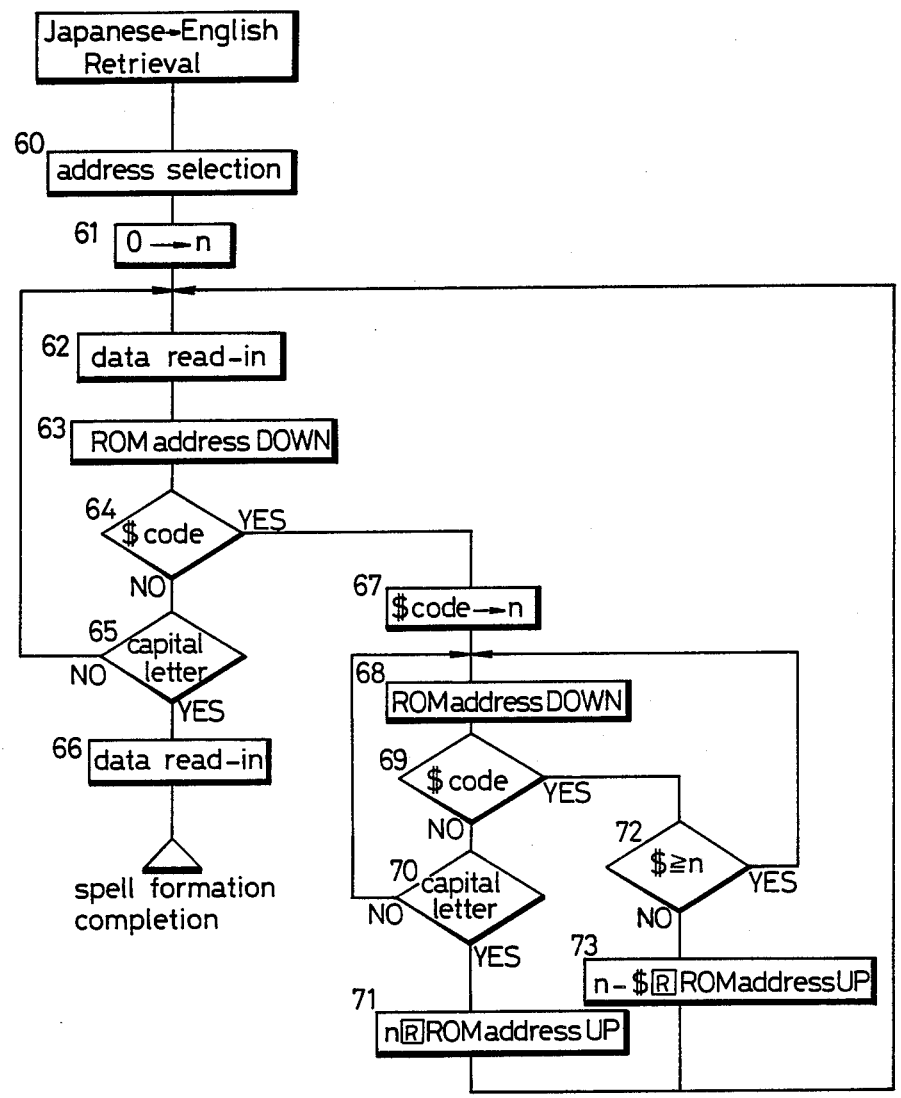

Then the flow chart shown in FIG. 5 is executed in which retrieval from Japanese to English is effected. In step 60, a certain address of the memory is selected by the address information introduced. In step 61, a counter n referred to "n" in "sn" code is canceled as this code is not detected. In step 62, data forming a spelling of English are entered to a register of the LSI for forming a spelling.

In step 63, the address of the memory is reduced by one, so that next address area containing next letters is selected. In step 64, "sn" code is determined. When this type of code is detected, letter spelling data are introduced which are stored in connection with the just preceding portion, with the object that this code is changed to certain letters. In step 67, the information "n" contained in this "sn" code is admitted to the counter n. A purpose of this operation in step 67 is to store what number of letters is required to be changed into alphabetical codes in future.

In steps 68, 69, and 70, the address areas are examined having the just preceding spelling information. As stated above, a great number of words are classified into groups according to the first and the second letters and stored in the memory. The first word of each of the groups is necessarily represented by the capital letter for the purpose of separating each group. When the capital letter is detected in step 70, it means that this position is just in the region of the group or block to be examined which has a great number of words.

Therefore, in step 71, the address of the memory is increased by such a degree equivalent to the number of data which is not introduced as the spelling code. Coming back to step 62, the program permits the spelling data to be entered. The detection of "sn" code in step 69 allows the comparison in step 72 between the information "n" of "sn" code and the contents of the counter n.

While the information "n" of this code is larger than the contents of the counter n, it leads to the recognition that there is absent spelling data needed to be introduced, in the word spellings presently selected. The program selects step 68 to examine next word.

When the spelling data are required to be introduced, step 73 is selected to advance the address of the memory by an amount equivalent to the number of the data required to be introduced. Step 62 is executed to allow the entry of the spelling data. Unless the capital letter is detected in step 65, step 62 is again executed to enable the repetition of the entry of the spelling data. If the capital letter is detected, step 65 is executed to allow the entry of the information.

Thus spelling formation operation is completed in the form of code information. The formed spelling code information is decoded to one or more alphabetical letters of English which are indicated in the display 22.

The retrieval from a Japanese word entered by the keyboard to the equivalent English word is accomplished.

A CIRCUIT CONFIGURATION

Figure 6:
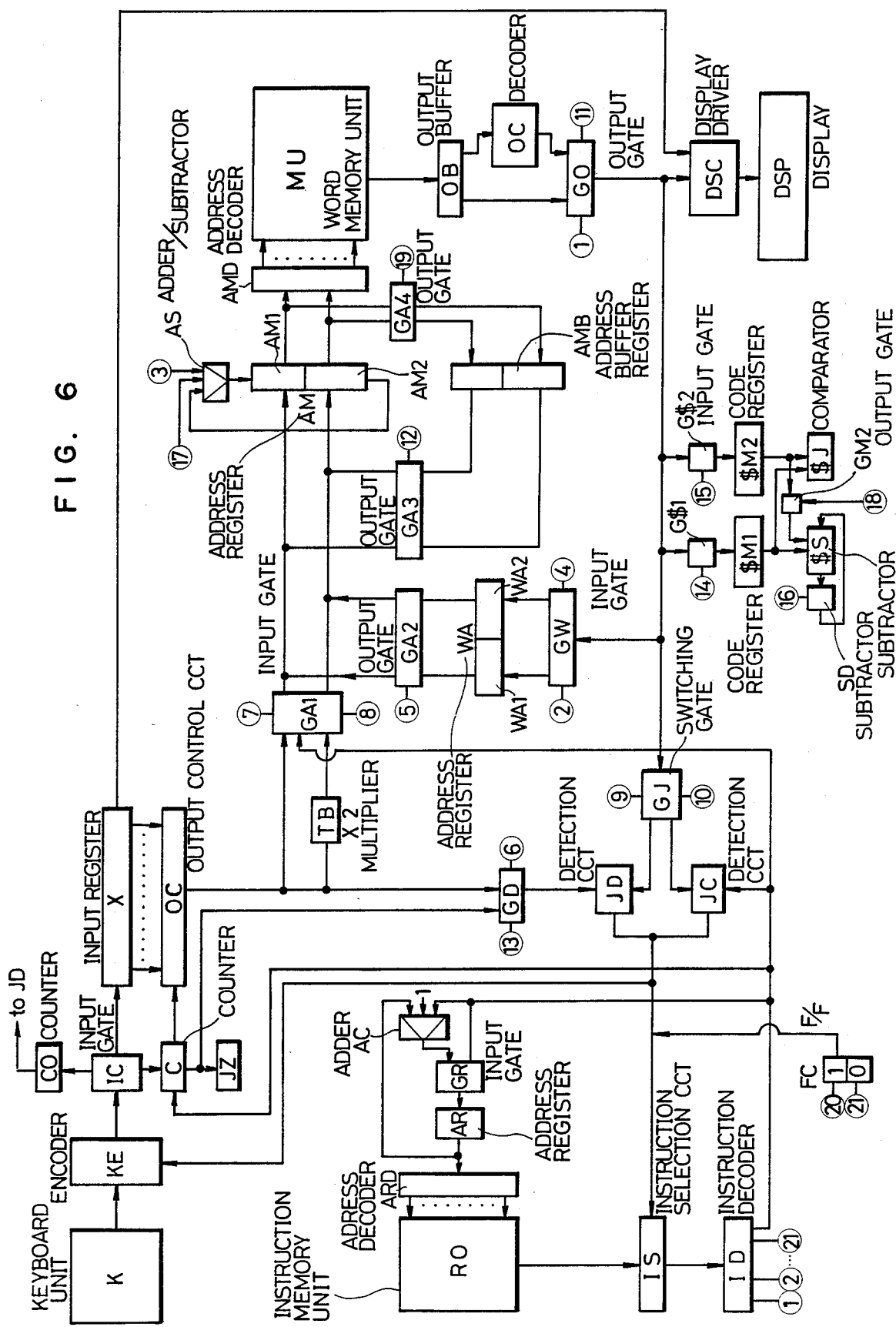
FIG. 6 is a block diagram of a circuit incorporated within the portable language interpreter shown in FIG. 1.

FIG. 6 shows a block diagram of a circuit of the present invention, where the retrieval from English to Japanese and vice versa are performed using the storage capacity compression as described above:

With reference to FIG. 6, the circuit comprises a keyboard unit K, an encoder KE, and input gate IC, and input register X referred to X register, counters CO and C, and a detection circuit JZ, and an output control circuit OC.

The keyboard unit K is related to a plurality of key switches 2 through 21 shown in FIG. 1. The counter CO functions to count the number of letters entered. The counter C acts to count letters to be specified by the output control circuit OC. The detection circuit JZ detects zero conditionsof the counter C. The input register X receives and stores the word entered. Output signals from the input register X are entered to the output control circuit OC.

The circuit further comprises a×2 pultiplier TB, an input gate GA1, an address register AM, an adder/subtractor AS, an address decoder AMD, and a word memory unit MU.

The input gate GA1 is provided for the purpose of the address register AM. A numeral AM1 is referred to more significant 8 bits of the information of the address register AM. A numeral AM2 is referred to less significant 6 bits of the information of the address register AM. The adder/sutractor AS is coupled to the address register AM for addition and subtraction calculations. The address decoder AMD is operated to address the word memory unit MU. The word memory unit MU is related to the memory described above. It has a great number of English and Japanese words, and other kinds of information as described previously.

The circuit further comprises an output buffer OB, a decoder OC, an output gate GO, a display driver DSC, and a display DSP.

The output buffer OB receives output signals from the word memory unit MU. The output gate GO is provided for selecting output signals from the output buffer OB and the decoder OC. The display DSP is related to the display 22 shown in FIG. 1.

The circuit further comprises an input gate GW, an address register WA, an output gate GA2, an address buffer register AMB, an output gate GA3, a switching gate GJ, a detection circuits JD and JC, and a gate GD.

The input gate GW is an input gate circuit for the address register WA. The address register WA is an address circuit for use with the word. A numeral WA1 is referred to more significant 8 bits stored in the address register WA. A numeral WA2 is referred to less significant 6 bits stored in it. The output gate GA2 is an output gate circuit for use in the address register WA. The output gate GA3 is an output gate circuit adapted for the address buffer register AMB. The switching gate GJ is a switching circuit for selecting input signals applied to the two detection circuits JD and JC. The detection circuit JD is a coincidence detection circuit for detecting the equivalency between the contents of the input register X and the output gate GO through the switching gate GJ. The detection circuit JC is a coincidence detection circuit for determining the equivalency between the code information developed from an instruction decoder ID and the output signals from the output gate GO through the switching gate GJ.

The circuit further comprises an instruction memory unit RO, an address decoder ARD, an address register AR, an input gate GR, an adder AC, an instruction selection circuit IS, an instruction decoder ID, and a flip flop FC.

The instruction memory unit RO memorizes a plurality of kinds of instruction information for use with the circuit to cause the program required. The address decoder ARD is provided for addressing the instruction memory unit RO in combination with the address register AR. The input gate GR is an input circuit for the address register AR. The adder AC is connected to the address register AR through the input gate GR to make an addition calculation to information of the address register AR. The instruction selection circuit IS is provided for receiving and selecting the instruction information outputted by the instruction memory unit RO. The instruction decoder ID is provided for decoding the instruction information and generating a plenty of kinds of micro-order signals ① through ㉑ entered to each of the circuit elements as specifically marked adjacent to them.

The circuit further comprises two code registers s $M_1$ and s $M_2$, a comparator s J, two subtractors SD and s S, two input gates G $s_1$ and G $s_2$, and an output gate GM2.

The comparator s J is provided for comparing two kinds of code information each stored in the two code registers s $M_1$ and s $M_2$. These two code registers are provided for memorizing "sn" code information. The subtractor s S is provided for causing a subtraction calculation between the information stored in the two code registers s $M_1$ and s $M_2$. The subtractor SD is a subtraction circuit for the subtractor s S. The two input gates G $s_1$ and G $s_2$ are input circuits for the two code registers s $M_1$ and s $M_2$. The output gate GM2 is an output circuit for the code register s $M_2$.

The outline of the circuit of FIG. 6 is that a coincidence determination is subsequently performed between data stored in the input register X by the actuation of the keyboard and the word information preliminarily stored in the word memory unit MU under the control by the instruction memory unit RO containing the instruction information in order. A specific kind of word information is obtained and indicated in the display DSP.

Figure 7:
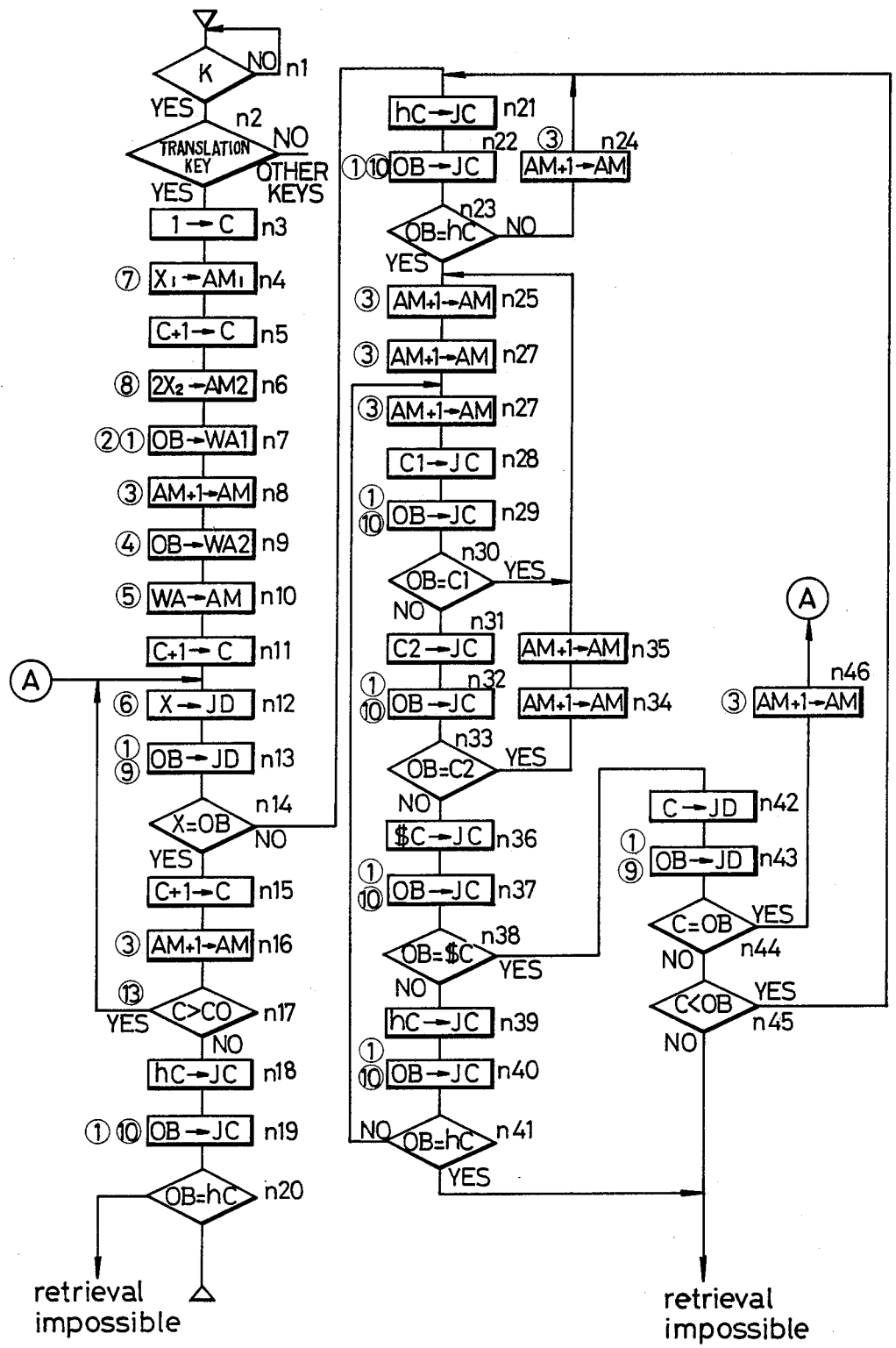
FIGS. 7 through 12 are flow charts representing various kinds of retrieval processes in accordance with the principle of the present invention.

FIG. 7 shows a flow chart representing retrieval operation from English to Japanese by the circuit shown in FIG. 6.

In FIG. 7, numeric values are referred to the micro-order signals developed from the instruction decoder ID of FIG. 6.

Upon the actuation of the Japanese translation key 3, the program is transferred from step n1 to step n2 and then step n3. In step n3, information "1" is applied to the counter C. By the selection of the top letter within the word stored in the input register X by the output control circuit OC, step n4 is executed where code information "X1" representative of the top letter stored in the input register X is applied to the portion referred to AM1 through the input gate GA1. In step n5, the information "2" is adapted to be stored in the counter C so that the output control circuit OC selects the second letter of the word stored in the input register X. In step n6, information "X2" is multiplied by 2 by the X2 multiplier TB meaning left shift by one bit. The resultant information is admitted to the portion referred to AM2 through the input gate GA1. It follows that the word memory unit MU is adapted to be adress by the information contained in the address register AM and to generate output signals entered to the output buffer OB. The output signals are constituted by 8 bits.

In step n7, the output buffer OB allows the transference of the output signals from the word memory unit MU into the output gate GO and then the portion WA1 of the address register WA through the input gate GW. In steps n8 and n9, another kind of output signal developed from the word memory unit MU in connection with next address information is entered to the portion WA2 of the address register WA. In step n10, the information stored in the address register WA representing the address of a certain letter, e.g., the third letter is transferred to the address register AM. The word memory unit MU delivers the output signals in response to the address information presently stored in it. The output signals are outputted to the output buffer OB. In the case where the input register X contains a particular word "safe", the address register WA is adapted to temporarily contain a specific address related to the third letter "C" of the word "Sacrifice" of Table 2.

Step n11 is executed to allow the addition of information "1" to the contents of the counter C. Step n12 is enabled to permit the transference of the information representative of "f" of the third letter contained the input register X to the detection circuit JD. In step n13, the contents of the output buffer OB, namely the letter "c" in this example, are applied to the detection circuit JD. It determines the coincidence therebetween. Now the coincidence is not established.

The coincidence is supposed to be detected by the detection circuit JD, so that step n15 is executed to select the following letter, the fourth letter in this example. In step n16, the word memory unit MU is controlled to develop next word information by the selection of the address information which is advanced by one. Step n17 is performed to allow the comparison between the contents of the two counters C and CO. The counter CO is a counting circuit for counting the number of letters applied to the input register X. In step 17, a determination is made whether the letter presently examined for the retrieval is the last letter of the letters entered to the input register X. When not, step n12 is again selected, so that steps n15 and n16 are executed to enable the coincidence detection regarding any specified letter. This operation is necessarily repeated. If there is present any letter which is determined not to be consistent, the program selects the pass from step n14 to n21. If the coincidence is detected that all the letters are completely consistent, the pass of steps n18→n19→n20 is selected. If the address is related to the part of speech information "hc", it mean that a train of addresses selected for use in the word memory unit MU is exactly corresponding to the word stored in the input register X.

In the case where the pass from step n14 to n21 is selected by the absence of the consistence, operations of steps n21→n22→n23→n24→n21→ . . . are repeated to permit the address to the word memory unit MU to be subsequently increased until the part of speech information "hc" is detected. When the information "hc" is outputted from the output buffer OB, steps n25 and n26 are executed to cause the address to be increased by 2. In step n27, the address information for the translation, following the part of speech information "hc" as shown in FIG. 1(A) is utilized.

Steps n28→n29→n30 are executed to enable the detection that the output buffer OB has the information of "C1" as shown in FIG. 1(F). When this type of information is stored in it, steps n25→n26 are selected to cause the address to be increased by 2. Steps n31→n32→n33 are conducted to enable the detection that it has the information of "C2" as shown in FIG. 1(G). Steps n34→n35→n25→n26 are required to cause the address to be increased by 4. Steps n36→n37→n38 are executed to allow the detection of "sn" code. If there is detected "sn" code, steps n42→n43→n44 are selected to allow the detection of the digit value "n" of this type of code and the coincidence determination between the letter specified by the counter C and that of the contents of the output buffer OB.

Figure 8:
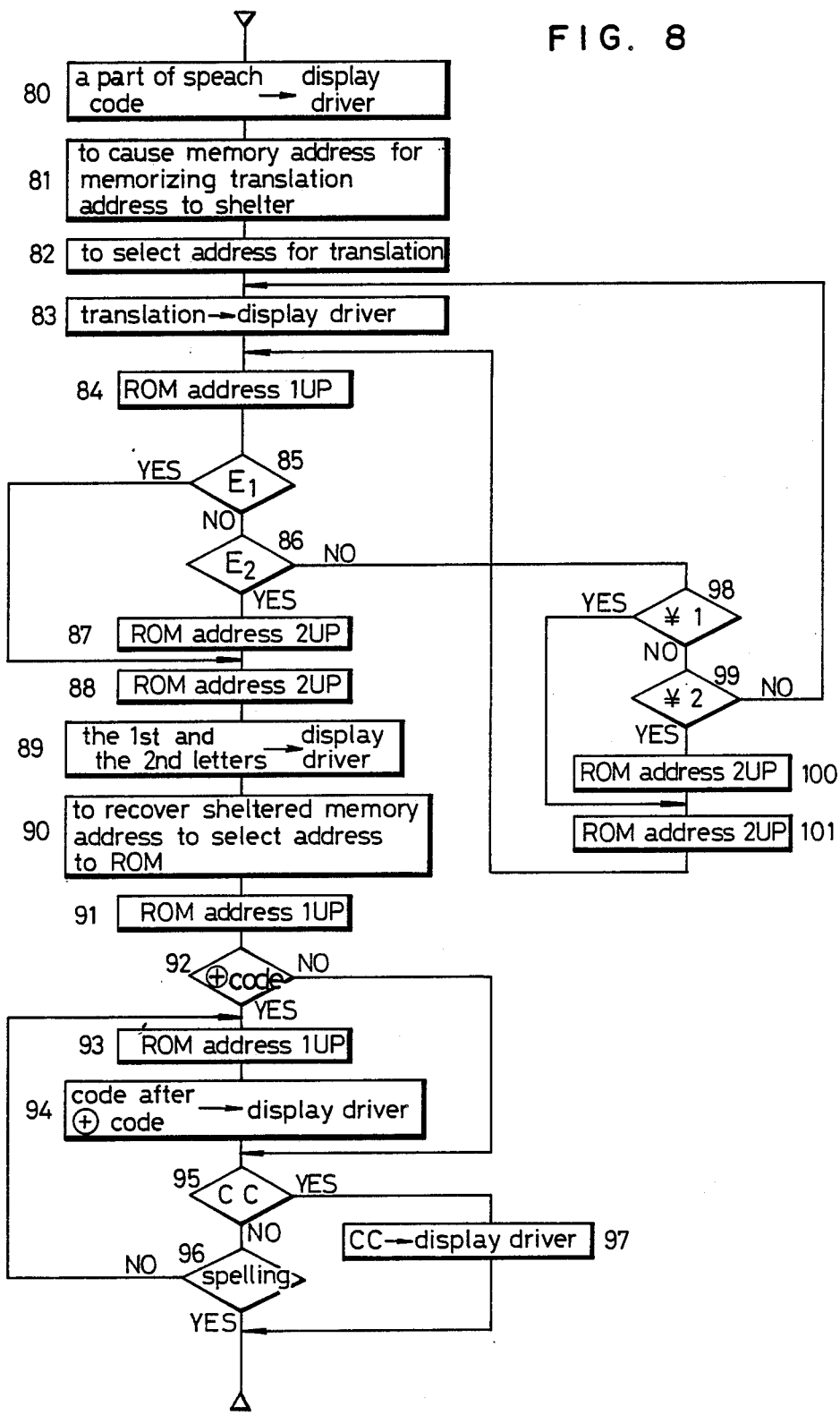

FIG. 8 shows an operational sequence for use in displaying a translated word and the part of speech by the equivalency between the spelling entered by the keyboard unit K and that stored in the word memory unit MU.

Referring to FIG. 8, step 80 is executed so that the part of speech information is decoded with the aim that the resultant information is entered to the display driver DSC. In step 81, the address information for the translation, stored in block 3 shown in FIG. 1(A) is sheltered. In step 82, the address for the translation is selected. For instance, a particular English word stored in block 1 of FIG. 1(A) is assumed to specify a translation of " ア イ マ イ ナ " so that the position of the information " ナ " of FIG. 3(A) is selected.

In step 83, the translated word is entered to the display driver DSC. In step 84, the address of the memory unit MU is advanced by one to allow the selection of the letter " イ ".

Steps 85, 86, 98 and 99 are executed so that it is determined whether the generation of the translated word comprising letters is completed. When the end code "E1" is detected, step 88 is performed so that the address of the memory unit MU is advanced by 2. When the end code "E2" is detected, steps 87 and 88 are necessitated so that the address of the memory unit MU is increased by 4.

When the symbol " ¥1" is detected representing that the following two-bytes information is the address information for the spelling like in the case of the end code "E1", step 100 is executed so that the address of the memory unit MU is increased by 2. When the symbol " ¥2" is detected, on the other hand, representing that the following four-bytes information is the address information steps 100 and 101 are needed so that the address is advanced by 4. When one of the end codes "E1" and "E2" is detected, step 89 is operated so that the first and the second letters, " ア イ " are entered to the display driver DSC. Thus the translated word equivalent to the word entered by the actuation of the keyboard unit K is obtained by the retrieval and indicated in the display DSP.

An indication of additional information is enabled by step 92 and the following steps. In step 90, the second part of the address code of two bytes for the translation stored in block 3 of FIG. 1(A) is selected so that a determination is caused wiether next block has the information of the address for the "⊕" code. If it has this type of code, the letter information following this type of code is entered to the display driver DSC.

Step 95 is executed so that the information stored in block 4 of FIG. 1(A) and the information in block 6 of it are detected. If these kinds of information is detected, the respective word information related to the information stored in blocks 5 and 7 is outputted and then decoded. The decoded information is entered to the display driver DSC for displaying purposes. A numeral "CC" of step 95 means the code information stored in blocks 4, 6, 8 and the like of FIG. 1(A).

When there is not stored the information of the phonetic symbols and accordingly there is stored the information about the varied form just following the address information of the translated word in FIG. 1(A), step 95 of FIG. 8 is executed so that the varied form information is detected. Alternatively, when another kind of spelling is stored just following the address information of the translated word, the passage from step 95 to step 97 is used, so that the retrieval for the translated word is terminated.

Figure 9:
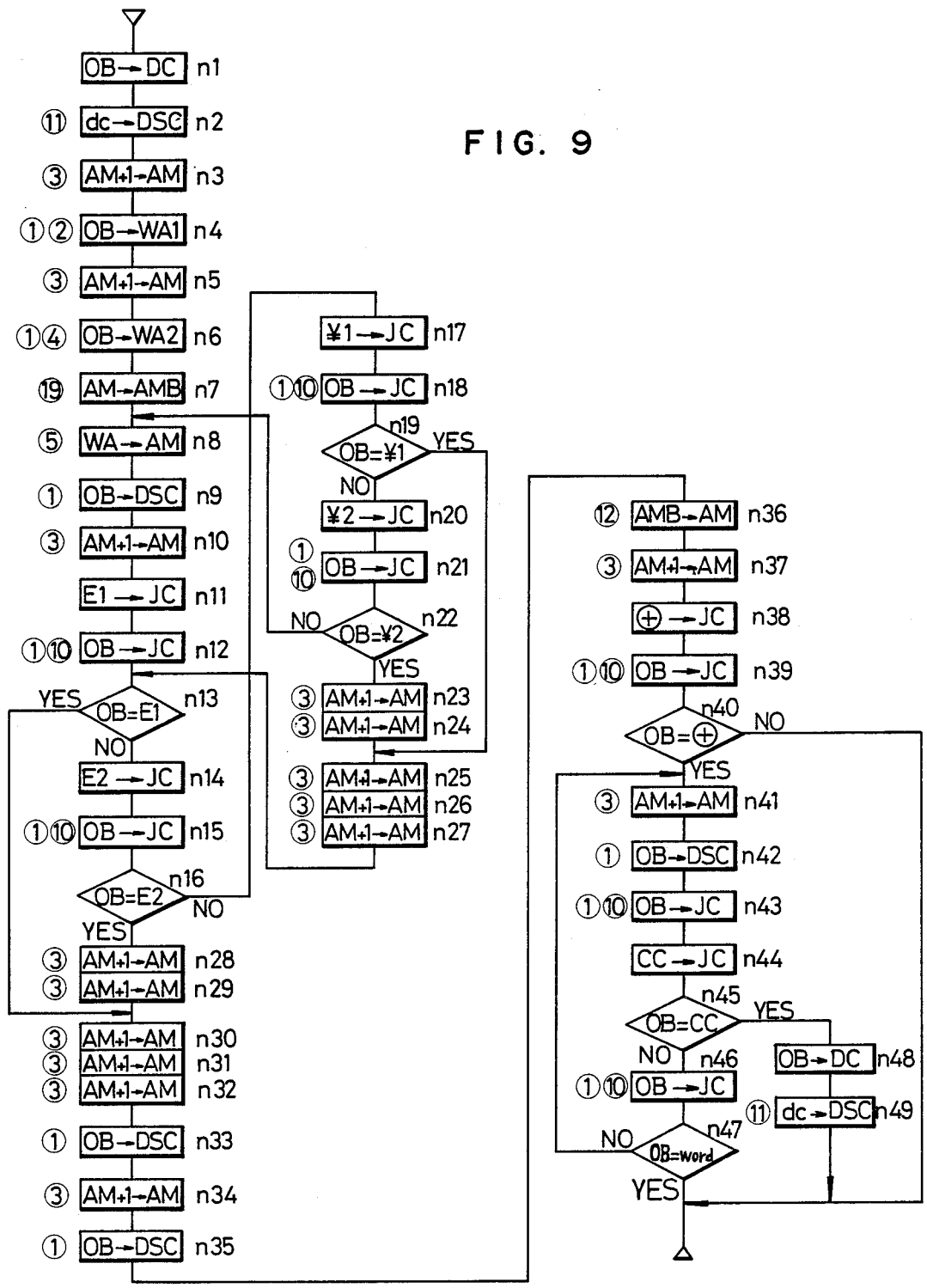

FIG. 9 is a flow chart referred to the operational sequence of FIG. 8 by the circuit indicated in FIG. 6.

Referring now to FIG. 9, operation of steps n1→n2 is referred to step 80 of FIG. 8, where the part of speech information is decoded by the decoder DC and thus decoded information is applied to the display driver DSC for display purposes. Operation of steps n3→n4→n5→n6→n7 is related to the step 81 of FIG. 8, so that the second part of the address information of two bytes for the translation stored in block 3 of FIG. 1(A) is sheltered into the address buffer register AMB. In step n8, the address for the translation is selected. Step n9 is operated so that one letter of the translated word is entered to the display driver DSC.

The following equivalency table is accomplished between the operation of FIG. 8 and the flow chart of FIG. 9.

| Step in FIG. 8 | Step in FIG. 9 |
| --- | --- |
| 85 | n11 → n12 → n13 |
| 86 | n14 → n15 → n16 |
| 98 | n17 → n18 → n19 |
| 99 | n20 → n21 → n22 |
| 100 → 101 | n23 → n24 → n25 → n26 → n27 |
| 87 → 88 | n28 → n29 → n30 → n31 → n32 |
| 89 | n33 → n34 → n35 |
| 90 | n36 |
| 92 | n38 → n39 → n40 |
| 93 | n41 |
| 94 | n42 |
| 95 | n43 → n44 → n45 |
| 96 | n46 → n47 |
| 97 | n48 → n49 |

Figure 10:
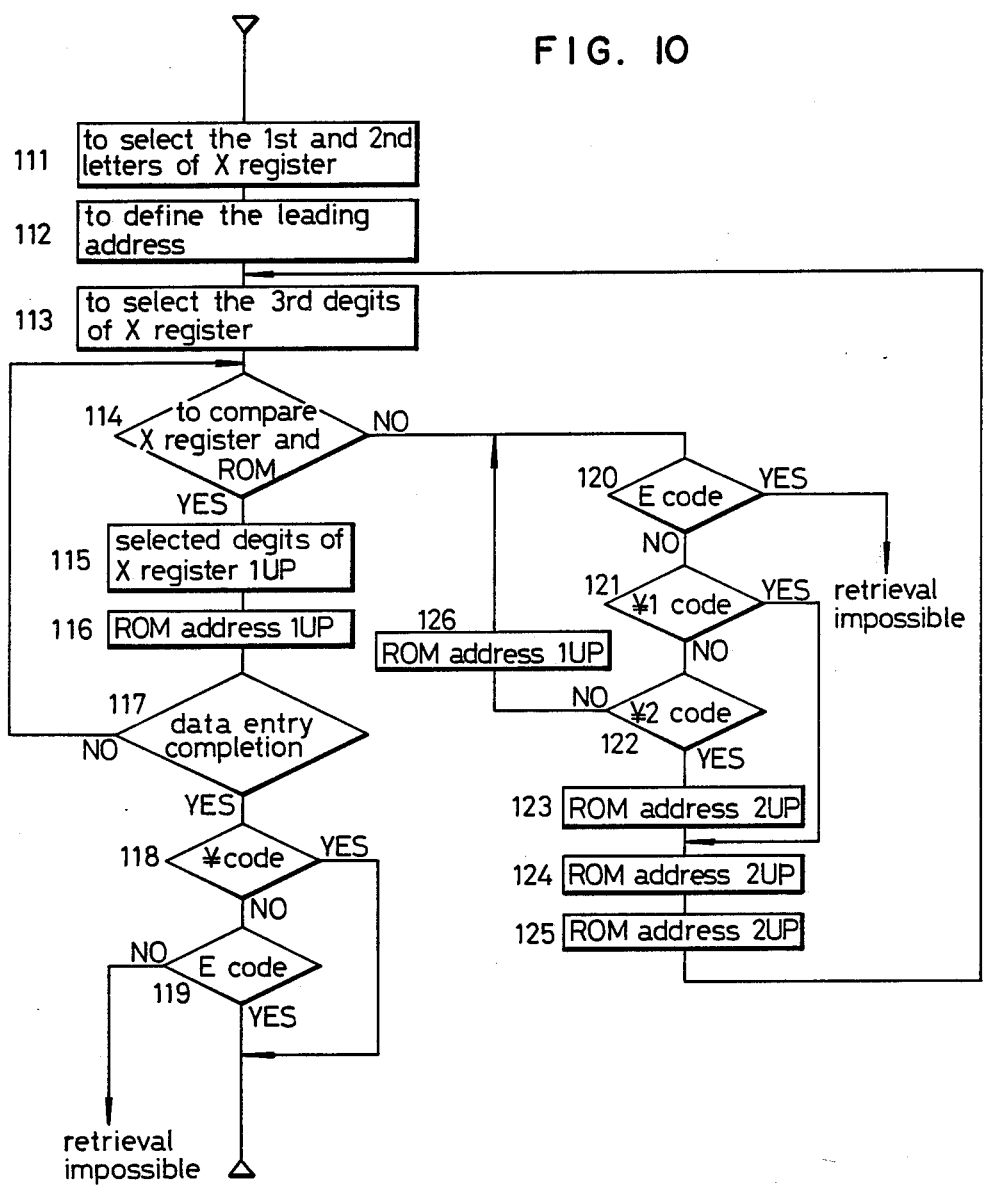

FIG. 10 is an operational sequence representing retrieval operation from a Japanese word entered by the keyboard unit K to an equivalent English word obtained by the retrieval by the circuit of FIG. 6. The English word obtained is indicated in the display DSP.

With reference to FIG. 10, step 111 is operated so that the first and the second letters are introduced into the input register X. Step 112 is executed so that the leading address of a certain letter of words starting at the first and the second letters is selected. For example, when a particular word " ァィマィナ " as shown in FIG. 3(A) is supposed to be entered, then a letter is specified. Step 113 is executed so that the third letter of the input register X is selected.

Step 114 is operated so that a comparison is made between one letter stored in the input register X and that developed from the word memory unit MU. Steps 114→115→116→117→114... are repeated while letters equal to and after the third letter of the input register X are in turn determined to be consistent. When all the letters from the third letter to the last letter are determined to be consistent, steps 118 and 119 are selected. If the symbolic code " ¥ " or the end code "E" is detected, it means that a desired word has been retrieved. In the case where the data entry is completed and the word memory unit MU is generating one or more kinds of letter information, it represents that the word entered is not found in a number of words stored in the word memory unit MU.

When a certain letter of the word is unable of finding a corresponding letter in the word memory unit MU, step 120 is selected so that next letter developed from the unit MU is subject to the coincidence determination. However, the code "E" is detected by step 120, it leads to the recognition that the word entered is determined to be absent from the memory unit MU. The retrieval is found to be impossible.

When the symbolic code " ¥1" is detected representing that the third part of information following it is the start of next letter, steps 124 and 125 are needed so that the address of the memory unit MU is increased by 3. Step 113 is come back so that the equivalency detection is operated from the third letter. When another kind of symbolic code " ¥2" is detected indicating that the five part of information following it is the beginning of next letter, steps 123, 124 and 125 are needed so that the address of the memory unit is increased by 5. Step 113 is again selected. Where there is no symbolic code of " ¥1" and " ¥2", step 116 is executed so that the address is increased by 1. Step 120 is again selected so that the leading letter of next word, actually, the third letter of it in this example, is examined.

Figure 11:
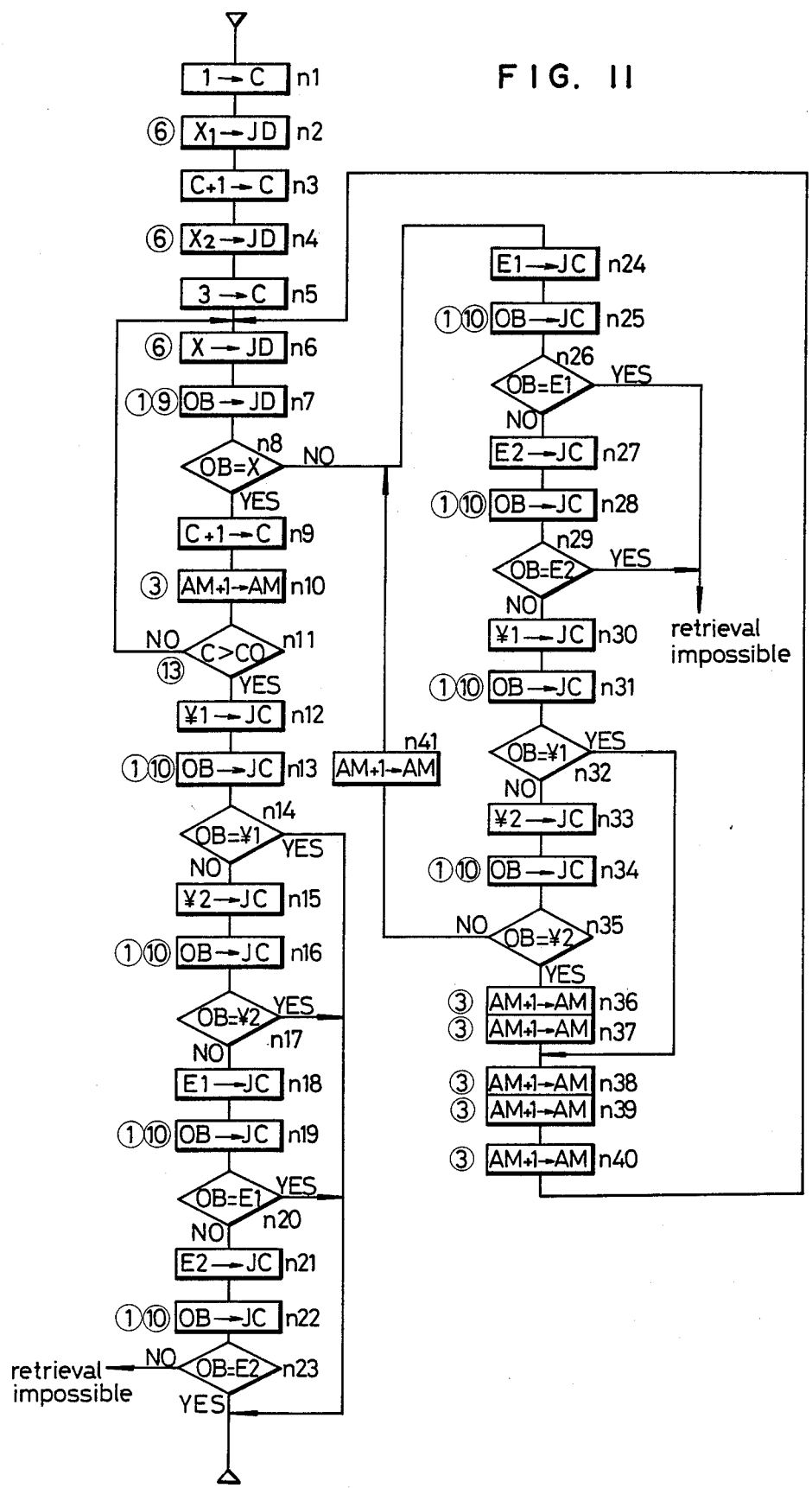

FIG. 11 is a flow chart of the operational sequence of FIG. 10 in connection with the operation of the circuit elements of FIG. 6.

With reference to FIG. 11, the following equivalent table is shown as compared to the operational sequence of FIG. 10.

| Step in FIG. 10 | Step in FIG. 11 |
| --- | --- |
| 111 | n1 → n2 → n3 → n4 |
| 113 | n5 |
| 114 | n6 → n7 → n8 |
| 115 | n9 |
| 116 | n10 |
| 118 | n12 → n13 → n14 → n15 → n16 → n17 |
| 119 | n18 → n19 → n20 → n21 → n22 → n23 |
| 120 | n24 → n25 → n26 → n27 → n28 → n29 |
| 121 | n30 → n31 → n32 |
| 122 | n33 → n34 → n35 |
| 123 → 124 → 125 | n36 → n37 → n38 → n39 → n40 |

Step n11 is operated to enable the comparison between the contents of the counter CO functioning to memorize the number of the letters entered to the input register X and those of the counter C acting to memorize the position of a particular letter presently selected. When C>CO, it leads to the recognition that all the letters entered have been determined to be consistent and step n12 is selected after step n11.

Figure 12:
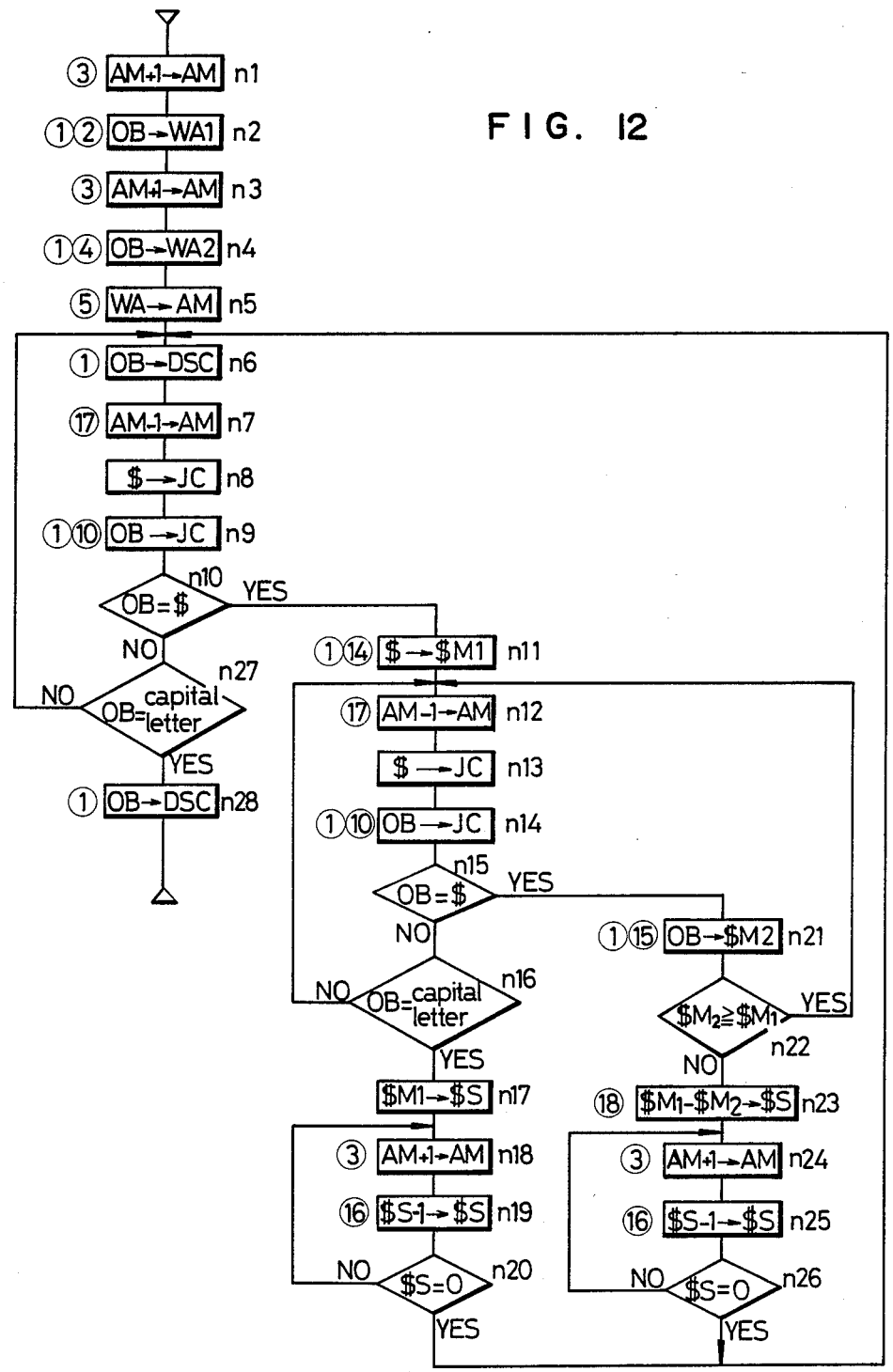

FIG. 12 is a more detailed flow chart of the operation of FIG. 5 by the circuit of FIG. 6. In FIG. 12, steps n1→n2→n3→n4→n5 are executed so that the address of the last letter of a desired spelling of an English word is selected. The following equivalence table is accomplished as compared to FIG. 5.

| Step in FIG. 5 | Step in FIG. 12 |
| --- | --- |
| 62 → 63 | n6 → n7 |
| 64 | n8 → n9 → n10 |
| 67 → 68 | n11 → n12 |
| 69 | n13 → n14 → n16 |
| 70 | n16 |
| 71 | n17 → n18 → n19 → n20 |
| 72 | n21 → n22 |
| 73 | n23 → n24 → n25 → n26 |
| 65 | n27 |
| 66 | n28 |

An indication of additional information rather than the translated word and the part of speech, as shown in FIG. 1(A) is enabled as follows:

For the phonetic symbols, the information stored in block 4 of FIG. 1(A) must be detected so that the following code information is decoded to allow the indication of the symbols.

For the varied form, the information stored in block 6 of FIG. 1(A) must be detected so that the following information comprising two bytes or four bytes is used as the address information. Any type of varied form on the basis of the original form can be obtained and indicated in the display DSP. For instance, a particular word is a verb such as "break" and then variation code information 136 is "C2" as shown in FIG. 13. The variation code information 136 represents that there are two kind of varied forms, the preterite "broke" and the past particle "broken" on the basis of the original form, namely, the infinitive "break". The selection of the address for the preterite by the actuation of the varied form key 9 once enables the indication of the preterite "broke". By the retrieval by the preterite "broke", the two parts of information 132 and 133 permit the indication that it is the preterite of the infinitive "break".

For the phrase, the spelling information following the phrase code information should be converted and indicated in the display DSP. As indicated in FIG. 16, the spelling of the phrase is stored with the help of the "*" code information. When the "*" code information is developed and detected, the address of the word memory unit MU is reversed and the spelling is inserted so that the phrase, e.g., "be about to" in this example is indicated.

Some features of storage method of the present invention are summarized as follows:

1. Data about a spelling, a part of speech, a meaning or translated word, one or more varied forms, a phrase and the like are stored in abbreviated form in a certain convention. Separation information is provided for spacing these kinds of data apart in the case where they are all stored in a memory.

2. A specific kind of address information is provided memorizing one or more varied forms on the basis of an original form. This kind of address information is stored within a part of storage areas having information of the one or more original forms. Another kind of address information is provided memorizing the original form for use with the one or more varied forms. The another kind of address information is stored in a part of storage areas storing information for the one or more varied forms.

3. In the feature of item 2, when the first and the second varied forms have the same spelling, the storage format for them can be made in common.

4. A great number of spellings are stored in English alphabetical order or Japanese alphabetical order. A part in common between one word and the following word is changed to abbreviation code information, with the object that storage capacity for them is minimized.

5. Syllables are grouped and changed to one kind of abbreviation code information.

6. A meaning or translated word is stored by address information specifying it. When additional word information is necessitated for supplementing it, the additional word information is stored in the form of code information representing the spelling or letters of this kind of word information.

7. When Japanese is used, a great number of Japanese words are stored in Japanese alphabetical order. A word block is provided grouping a certain number of Japanese words having the first and the second letters which are in common. As far as the first and the second letters which are in common are stored in a part of storage format, all the words classified in the word block are stored by memorizing other letters except for the first and the second letters.

8. A particular form of a spelling is stored by abbreviation code information, whereby a phrase can be formed in combination with letters which are stored by alphabetical code information.

While only certain embodiments of the present invention have been described, it will be apparent to those skilled in the art that various changes and modifications may be made therein without departing from the spirit and scope of the invention as claimed.

What is claimed is:

1. In an electronic dictionary and language interpreter device wherein a first word or words represented in a first language are entered for retrieving a second word or words represented in a second language equivalent to the first word or words or for retrieving the definition of a word in either language, the improvement comprising:

input means for entering a specific entry word;

abbreviation memory means for storing a plurality of words in a word block in alphabetic order, said plurality of alphabetized words having letters in common forming common repeating parts of said plurality of words, wherein said plurality of words in the word block are stored in an abbreviated code format comprising abbreviated code information representing said common repeating parts of said plurality of words and additional data representing other letters of said plurality of words;

retrieval means responsive to the input means for retrieving abbreviated code information and additional data to construct a retrieved word related to the specific entry word; and display means responsive to said retrieval means for displaying said retrieved word.

2. The device according to claim 1, wherein abbreviated code information related to different words are separated by separation code information in said memory means.

3. The device according to claim 1, wherein said abbreviation memory means stores information related to a first form of the specific entry word and address information related to one or more additional forms which are variations of the first form.

4. The device according to claim 3, wherein said abbreviation memory means stores information related to two or more of said additional forms having the same spelling in a common storage area.

5. The device according to claim 1, wherein said abbreviation memory means stores selected syllables of said plurality of words in the form of abbreviated code information.

6. The device according to claim 1, wherein said abbreviation memory means stores address information related to said second word or words in said second language.

7. The device according to claim 6, wherein said abbreviation memory means stores additional word information, for supplementing said information related to said second word or words in the form of alphabetical code information related to the spelling of said second word or words.

8. The device according to claim 1, wherein the abbreviation memory means stores particular forms of a spelling by abbreviated code information, wherein a phrase may be formed by said abbreviated code in combination with additional letters stored as alphabetical code information.

9. In an input arrangement comprising a plurality of input switches adapted for an electronic dictionary and language interpreter device wherein a first word or words represented in Japanese characters are entered by actuation of a selected combination of input switches to obtain a second word or words represented in a second language expressed in Roman letters equivalent to the Japanese word or words or to obtain the definition of a word in either language, the improvement comprising:
a Japanese character identifier associated with each of said input switches and one or more Roman letters associated with each input switch for identifying said respective Japanese character input by said input switch to an operator who understands said second language for assisting the operator with the key input of Japanese characters.

10. A method for storing word information in a memory of an electronic dictionary and language interpreter device wherein a first word or words represented in a first language are entered from a keyboard as individual letters which form said word or words to obtain a second word or words represented in a second language equivalent to the first word or words or to obtain the definition of a word in either language, the improvement comprising the steps of:
arranging words into groups having sets of two or more characters in sequence common to a plurality of words in the respective groups;
representing said sets of characters common to said words with abbreviated digital codes of fewer bits than the total number of bits required to individually represent all characters of said respective sets;
representing individually remaining characters of said words with character digital codes; and
storing said abbreviated digital codes and said character digital codes in a memory of said device for reducing the required memory capacity to store said words.

* * * * *